UNITED STATES PATENT OFFICE.

HENRY GERNER, OF NEW YORK, N. Y., ASSIGNOR TO THE HEVEENOID MANUFACTURING COMPANY, OF SAME PLACE.

MANUFACTURE OF GOODS FROM CAOUTCHOUC, &c.

SPECIFICATION forming part of Letters Patent No. 226,058, dated March 30, 1880.

Application filed November 12, 1879.

*To all whom it may concern:*

Be it known that I, HENRY GERNER, of the city of New York, in the county of New York, and in the State of New York, have invented a new and useful Process for the Manufacture of Goods and Articles from Caoutchouc, (India-Rubber,) Gutta-Percha, and analogous gums, which process is fully set forth in the following specification.

This invention relates to an improved process having for its design the cheapening, coloration other than black, enlarging the field of utility, and enhancing the merits of vulcanized products.

The invention consists in taking camphor dissolved in alcohol, naphtha, or other suitable solvent, and mixing it with sulphur, as ordinarily used in compounds of caoutchouc, and, after evaporating all moisture caused by the application of the solvent to the camphor, combining the two with caoutchouc in an ordinary roller or mixing machine. A thorough chemical combination is formed—a result not attained by mixing caoutchouc, gutta-percha, or other gum with sulphur alone and exposing the mixture to heat, the combination being only to a very limited degree, and the gum and the sulphur being only mechanically mixed and held together. By the introduction of camphor a much cheaper article is produced, to say nothing as yet of its superiority, than can be shown by old and present methods.

In order to incorporate the camphor properly with the caoutchouc (it is unnecessary to repeat "gutta-percha and analogous gums" further) and the sulphur, (the same observation applying to "or sulphur in its combinations,") the camphor may be dissolved in alcohol, naphtha, benzine, gasoline, or equivalents of these, and the solution so obtained mixed with the sulphur and such other ingredients as it may be desired to incorporate into the mixture. The hydrocarbon or other solvent employed in the dissolution of the camphor is then evaporated by heat, leaving a mixture of camphor, sulphur, and ingredients referred to in the foregoing period, all in the form of an impalpably-powdered state, which is then ready to be incorporated with the caoutchouc on the rollers or mixing-machines usually employed in rubber-factories for the incorporation of sulphur and other ingredients with the gum.

The foreign ingredients referred to in my compound may be reduced to the finest consistency by grinding and passing them through bolting-cloth; or, instead of this method of incorporating the camphor with the sulphur and the caoutchouc, the camphor may be dissolved in the same solvent which at the same time holds the caoutchouc in solution, such as bisulphide of carbon or most of the solvents already enumerated. The sulphur and other ingredients may have been previously added to the gums in the same vessel, or may be added during or after dissolution. The solvent is finally evaporated off by heat.

I have found in practice that equal parts of camphor, sulphur, and caoutchouc, properly mixed together and exposed to the proper heat—say from 260° to 320° Fahrenheit—during the proper length of time, varying with different thicknesses, makes a very desirable, hard, and flexible compound; but the proportions of camphor, sulphur, and caoutchouc may be varied, according to the quality, flexibility, and consistency required for the different purposes to which the caoutchouc is to be applied in the manufacture of different articles and goods. Experience has also taught me that a greater amount of sulphur is required to properly vulcanize a compound of caoutchouc and camphor than when the caoutchouc is alone and the camphor is wanting. In fact, I have found that about the same amount of sulphur which is required to properly vulcanize caoutchouc is also required for hardening or vulcanizing the camphor incorporated with the caoutchouc; but of course these proportions vary according to the character of the goods required to be manufactured, whence it will readily be seen why equal parts of caoutchouc, camphor, and sulphur form a desirable vulcanite, since the proportions of caoutchouc and sulphur in ordinary vulcanite are as one to one-half. I have also found that the medium in which compounds of caoutchouc, camphor, and sulphur are vulcanized greatly influences the color of the vulcanized article.

Thus by vulcanizing in alcohol lighter colors may be obtained, while by introducing metallic alkaloids into the alcohol in the vulcanizing-vessel different shades and colors—light and dark, single and blended—may be realized.

The length of time of vulcanization and the temperature have also a great influence on the color of the vulcanized article. Thus, exposed to a lower degree of heat and a longer time the resultant vulcanite will be lighter in color, while if exposed to a higher degree of heat and a shorter time the color will be darker; but all other methods by which hard or soft gums are vulcanized may be employed to the same advantage for all compounds containing camphor.

If caoutchouc, camphor, and sulphur in the proper proportions are exposed to heat, like common vulcanite or ebonite compounds are at the present time, a dark-brown vulcanite will be the result; and although the admixture of different substances into the compound preparatory to vulcanization, such as metallic oxides, calcium, ivory-dust, bone-dust, coal-tar, &c., in a more or less great degree affects the colors, brown colors and shades, as a rule, will be the prevailing effects.

Articles made from compounds with camphor, especially hard-rubber goods, may be bleached by immersing them in alcohol, acid, and chlorine baths; and different colors and shades of color may also be given such articles by exposing them to treatment in the same manner as for coloring ivory goods.

Be it understood that by the word "vulcanite," unless otherwise stated, I mean to express the result of a process of vulcanization. It must not be confounded with "ebonite."

Having thus clearly described my improvements in the treatment of caoutchouc, gutta-percha, and analogous gums with camphor and sulphur, or sulphur in its combinations, and other ingredients, I desire to claim, in general, the use of camphor, both natural and artificial, and its equivalents in all processes of rubber-manufacture or analogous manufactures, and more particularly—

1. The herein-described process of treating caoutchouc, consisting of first mixing dissolved camphor and sulphur, then evaporating the moisture caused by the camphor-solvent, and then mixing caoutchouc with these combined matters, and finally vulcanizing the compound by subjecting it to heat, substantially as set forth.

2. A compound for use in the manufacture of goods, consisting of equal parts of camphor properly dissolved, sulphur, and caoutchouc, or analogous gums, as set forth.

HENRY GERNER.

Witnesses:
M. DITTENHOEFER,
CHAS. H. CALISCH.